United States Patent
Sullivan et al.

(10) Patent No.: US 6,542,898 B1
(45) Date of Patent: *Apr. 1, 2003

(54) TECHNICAL SUPPORT CHAIN AUTOMATION WITH GUIDED SELF-HELP CAPABILITY USING ACTIVE CONTENT DEVELOPED FOR SPECIFIC AUDIENCES

(75) Inventors: Francis X. Sullivan, Round Rock, TX (US); Brian Jay Vetter, Austin, TX (US)

(73) Assignee: Motive Communications, Inc., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/310,399

(22) Filed: May 12, 1999

(51) Int. Cl.[7] .............................................. G06F 17/00
(52) U.S. Cl. .......................................... 707/102; 707/9
(58) Field of Search ...................... 707/1–6, 9, 100–104

(56) References Cited

U.S. PATENT DOCUMENTS

| | | | |
|---|---|---|---|
| 5,107,500 A | 4/1992 | Wakamoto et al. | 371/15.1 |
| 5,581,664 A | 12/1996 | Allen et al. | 706/11 |
| 5,664,093 A | 9/1997 | Barnett et al. | 395/183.07 |
| 5,678,002 A | 10/1997 | Fawcett et al. | 395/183.01 |
| 5,701,399 A | 12/1997 | Lee et al. | 706/11 |
| 5,742,773 A | 4/1998 | Blomfield-Brown et al. | 395/200.58 |

(List continued on next page.)

OTHER PUBLICATIONS

SystemWizard™—The End–to–End Solution, SystemWizard™ Builder, SystemWizard™ Server, SystemWizard™ Client, Copyright 1998 SystemSoft Corporation.
Replicase Self–Healing Software, Self–Healing System 1.0, Copyright, 1998, Replicase, Inc. pp. 1–10.

(List continued on next page.)

Primary Examiner—James P. Trammell
Assistant Examiner—Mary Wang
(74) Attorney, Agent, or Firm—Campbell Stephenson Ascolese LLP

(57) ABSTRACT

Guided self-help is facilitated through use of so-called "active content" pages that are selectively viewable by given "audiences" within a technical support chain automation system. Active content is Web-based content (e.g., content viewable by a Web browser) that has one or more diagnostic maps initiated when certain actions are taken According to the invention, users are assigned to a hierarchy of audiences. A given audience within the hierarchy has the right to view active content written for that audience and active content written for any audience within the hierarchy at a lower level in the hierarchy. Given segments or portions of an active content database are associated with given audiences in the hierarchy. Thus, during a guided technical support session initiated by a user, given active content is served to the user as a function of the audience to which the user has been assigned.

16 Claims, 11 Drawing Sheets

U.S. PATENT DOCUMENTS

| | | | |
|---|---|---|---|
| 5,754,766 A | | 5/1998 | Shaw et al. ............... 395/200.3 |
| 5,787,234 A | | 7/1998 | Molloy ......................... 706/46 |
| 5,790,780 A | | 8/1998 | Brichta et al. ......... 395/183.22 |
| 5,878,415 A | * | 3/1999 | Olds ............................. 707/9 |
| 5,908,383 A | | 6/1999 | Brynjestad .................. 600/300 |
| 5,918,004 A | | 6/1999 | Anderson et al. ...... 395/183.14 |
| 5,926,624 A | | 7/1999 | Katz et al. ............. 395/200.47 |
| 5,941,947 A | * | 8/1999 | Brown et al. ............... 709/225 |
| 5,944,839 A | | 8/1999 | Isenberg ...................... 714/26 |
| 5,983,234 A | * | 11/1999 | Tietjen et al. .............. 707/103 |
| 5,983,364 A | | 11/1999 | Bortcosh et al. ............. 714/25 |
| 5,983,369 A | | 11/1999 | Bakoglu et al. ............. 714/46 |
| 5,992,737 A | | 11/1999 | Kubota ....................... 235/380 |
| 5,994,032 A | | 11/1999 | Goffing et al. ............. 430/307 |
| 5,995,956 A | | 11/1999 | Nguyen ....................... 706/54 |
| 6,014,651 A | * | 1/2000 | Crawford .................... 705/400 |
| 6,026,500 A | | 2/2000 | Topff et al. .................. 714/26 |
| 6,041,323 A | | 3/2000 | Kubota ........................ 707/5 |
| 6,145,096 A | | 11/2000 | Bereiter et al. .............. 714/25 |
| 6,167,395 A | | 12/2000 | Beck et al. .................... 707/3 |
| 6,170,011 B1 | | 1/2001 | Macleod Beck et al. ... 709/224 |
| 6,170,065 B1 | | 1/2001 | Kobata et al. ............... 714/7 |
| 6,177,932 B1 | * | 1/2001 | Galdes et al. ............. 345/329 |
| 6,185,606 B1 | | 2/2001 | Bereiter ...................... 709/206 |
| 6,195,426 B1 | * | 2/2001 | Bolduc et al. .............. 379/266 |
| 6,195,666 B1 | * | 2/2001 | Schneck et al. ............ 707/513 |
| 6,195,763 B1 | | 2/2001 | Mayer et al. ................. 714/25 |
| 6,205,579 B1 | | 3/2001 | Southgate .................... 717/11 |
| 6,219,667 B1 | * | 4/2001 | Lu et al. ........................ 707/9 |
| 6,219,719 B1 | | 4/2001 | Graf ............................. 710/1 |
| 6,230,287 B1 | | 5/2001 | Pinard et al. ................. 714/31 |
| 6,236,989 B1 | | 5/2001 | Mandyam et al. ............. 707/4 |
| 6,237,114 B1 | | 5/2001 | Wookey et al. ............... 714/47 |
| 6,240,420 B1 | | 5/2001 | Lee ............................ 707/102 |
| 6,256,620 B1 | * | 7/2001 | Jawahar et al. ................ 707/2 |
| 6,260,048 B1 | * | 7/2001 | Carpenter et al. ........... 707/104 |
| 6,279,125 B1 | | 8/2001 | Klein ........................... 714/38 |
| 6,298,457 B1 | | 10/2001 | Rachlin et al. ............... 714/49 |
| 6,321,348 B1 | | 11/2001 | Kobata ........................ 714/37 |

OTHER PUBLICATIONS

The Attune™ System, Attune Product Line Overview, Aveo, http://www.aveo.com/products/attndata.html, Oct. 15, 1998, pp. 1–3.

Attune Prevent™, Attune Prevent Overview, Aveo, http://www.aveo.com/products/attnprevent.html, Oct. 15, 1998, pp. 1–3.

"First Aid Fixes Your PC Problems," First Aid: Overview, CyberMedia, http://www.cybermedia.com/products/firstaid/, Oct. 15, 1998, pp. 1–2.

"When Disaster Strikes," First Aid Details, CyberMedia, http://www.cybermedia.com/products/firstaid/fainfo.html, Oct. 15, 1998, pp. 1–3.

"Talkback™, Connecting The People Who Build And Support Software With The People Who Use It," A Whitepaper presented by Full Circle Software, Inc., Jul., 1998.

"The Year's Ten Best Web Support Sites," produced by Soft Letter & The Association Of Support Professionals, published by The Association Of Support Professionals, 1998, pp. 1–10.

* cited by examiner

MOTIVE COMMUNICATIONS
FIRST IN SUPPORT CHAIN AUTOMATION

Enter your query below:

[ search string ]   [ Search ]
    −90    −88    Tips for searching

☐ Use Free-Text Query

Alerts and Late-Breaking Information

- ☐ Alert-alert

---

Current Category: 🗁 top

SubCategories
- 🗁 comp
- 🗁 jdirect
- 🗁 Duke's
- 🗁 Bill's
- 🗁 Jeremy
- 🗁 Mike's
- 🗁 sanjay
- 🗁 enrico
- 🗁 Corey
- 🗁 Category
- 🗁 testing
- 🗁 Self Help
- 🗁 This is a test
- 🗁 Test Cat
- 🗁 Jerry
- 🗁 Omar
- 🗁 Solaris
- 🗁 Outlook Express
- 🗁 New Category

---

Active Content for the Current Category

91⟶
- ❓ FAQ - nbn
- • Release Note - Test Release Note
- ❓ Support Note - Guided support for Outlook Express
- ❓ FAQ - New FAQ

FIG. 7

MOTIVE COMMUNICATIONS
FIRST IN SUPPORT CHAIN AUTOMATION
Search Results

Documents 1 to 1 of 1 matching the query "wwintl32.dll".

1. Support Note: Wrong Wwintl32.dll Error
   *Abstract*: Wrong Wwintl32.dll Error. Problem. Solution. Support Note:. The information in this article applies to: Microsoft Word 97 for Windows, Service Release 1 (SR-1) SYMPTOMS: When you attempt to start Microsoft Word after you have run the Microsoft Office 97 Service Release 1 (SR-1) Patch, you may receive the following error message:
   *size 3,571 bytes - 10/2/98 12:21:04 PM GMT*

*The index is up-to-date.*

Page 1 of 1

*FIG. 8*

MOTIVE COMMUNICATIONS
FIRST IN SUPPORT CHAIN AUTOMATION

💡 *Support Note:*

Wrong Wwintl32.dll Error

Problem

🔍 Diagnose

The information in this article applies to:

* Microsoft Word 97 for Windows, Service Release 1 (SR-1)

SYMPTOMS: When you attempt to start Microsoft Word after you have run the Microsoft Office 97 Service Release (SR-1) Patch, you may receive the following error message:

The wrong WWINTL32.DLL has been loaded.

CAUSE: This error message occurs when the versions of the Winword.exe file and the Wwintl32.dll file are not the same.

NOTE: It is not sufficient to check the file version information that is displayed when you right-click the program icon and click Properties on the shortcut menu.

This problem may also occur if a wwintl32.dll file is located in the Windows/System directory.

Solution

✎ Fix

When you install the SR-1 Patch, the Winwork.exe or the Wwintl32.dll files are not properly updated. Select the Motive Fixit icon lower to resolve this problem.

More Background: The following table shows the file size and date of the Winword.exe file installed by Word 97 or the Word 97 SR-1 Patch.

| Version | File Size | Date |
|---|---|---|
| Word 97 | 5194 KB | 11/17/96 |
| Word 97 SR-1 Patch | 5200 KB | 7/11/97 |

The default location for the Winword.exe is the C:\Program Files\Microsoft Office\Office folder.

The following table shows the file size, date and location of the Wwintl32.dll file installed by Word 97 and the Word 97 SR-1 Patch.

| Version | File Size | Date |
|---|---|---|
| Word 97 | 1131 KB | 11/17/96 |
| Word 97 SR-1 Patch | 1132 KB | 7/11/97 |

The default location for the Wwintl32.dll file is the following:

*FIG. 9*

MOTIVE COMMUNICATIONS
FIRST IN SUPPORT CHAIN AUTOMATION

Active Self Service Results

You have this problem. The version of the installed library Wwintl32.dll is not correct. Select the fix it diagnostic to resolve this issue.

Related Links

This Motive diagnostic session suggested the following related links:

> Main Microsoft Office Site

Related Information

This Motive diagnostic session suggested some hints that should turn up some relevant related information. Click on the View Related Information button if you want to view this related information.

> [ View Related Information ]

---

Need Live Help? Since answers to many known problems can be found here, we encourage you to continue using our self service system. However, if you are not able to locate the answer to your problems, and want to work with a live support engineer, click here, and someone will help you as soon as possible.

*FIG. 10*

MOTIVE COMMUNICATIONS
FIRST IN SUPPORT CHAIN AUTOMATION

Active Self Service Results

The version of the installed library Wwintl32.dll has been updated. You should be able to use word now.

Related Links

This Motive diagnostic session suggested the following related links:

Main Microsoft Office Site

Related Information

This Motive diagnostic session suggested some hints that should turn up some relevant related information. Click on the View Related Information button if you want to view this related information.

| View Related Information |

Need Live Help? Since answers to many known problems can be found here, we encourage you to continue using our self service system. However, if you are not able to locate the answer to your problems, and want to work with a live support engineer, click here, and someone will help you as soon as possible.

TECHNICAL SUPPORT CHAIN AUTOMATION WITH GUIDED SELF-HELP CAPABILITY USING ACTIVE CONTENT DEVELOPED FOR SPECIFIC AUDIENCES

RELATED APPLICATION

This application is related to Ser. No. 09/216,212, filed Dec. 18, 1998.

BACKGROUND OF THE INVENTION

1. Technical Field

The present invention relates generally to automated customer support and service in a distributed computing environment and more particularly to a method of reducing a number of "live" support calls by providing intelligent, guided self-help in such an environment.

2. Description of the Related Art

Technical support services and programs are designed to diagnose and solve hardware or software problems that users and/or customers encounter as they use computers. As businesses continue to move on-line, distributed computing environments become more complex and, thus, more difficult to troubleshoot. Indeed, entire businesses now desire to connect their critical business systems directly to employees, customers, vendors and other important constituencies. To this end, many internal or external business network applications are now being connected to the Internet's World Wide Web to make the information accessible from anywhere using conventional browser software.

Traditional technical support centers place their emphasis on internal tracking and productivity tools, such as problem tracking systems. Such "back end" systems exist internally to the support organization and are usually transparent to the customer. Although back-end systems aid internal efficiency, they do little for the actual problem resolution process itself. Problem resolution is typically left to telephony-based technologies such as agent-based automatic call distribution (ACD) support centers and intelligent voice response (IVR) devices.

Such techniques attempt to diagnose and address problems on a remote node without actually having the technician travel to that node. The most common method of technical support is still a telephone conversation with tech support personnel. Other known techniques involve a network "login" to the remote node so that the conditions may be evaluated from the technical support center's viewpoint. The network connection may be used to run a diagnostic program on the remote node, or "selfhelp" fix-it programs may be downloaded to the remote note and executed there.

With the explosive growth of the Internet, yet another approach has become quite popular. This approach involves having the user access a Web server with support content in the form of support notes or FAQs. The user attempts to use this information to "self service" his or her own problem. On its face, this strategy appears sensible as, theoretically, an effective self-service strategy would let users solve problems for themselves (e.g., through a Web browser), with the result of lower call volumes and better service. Unfortunately, however, using the Web as a publishing medium has not resulted in the desired benefits. Indeed, call avoidance has often evolved into "customer avoidance". In particular, most normal users do not want to be "detectives" who have to make a set of guesses about the precise search strings that will get them to the right support solutions. Further, it is quite frustrating for users who cannot solve their problems (by self-service) to then be forced to go through the tedious exercise of later repeating to a support engineer information concerning their self-service attempts. The result is that end users often feel like their vendor is trying to push them away, with the inevitable result that this unintended result may actually occur.

Indeed, studies have shown that, even when a user knows an answer exists to his or her problem, he or she will be able to find the answer only 40% of the time. Further, many "answers" have very complex diagnoses and resolutions that are well beyond the capabilities of most computer users.

The present invention addresses this problem.

BRIEF SUMMARY OF THE INVENTION

Guided self-help is facilitated through use of so-called "active content" pages that are selectively viewable by given "audiences". Active content is Web-based content (i.e., content viewable by a Web browser) that has one or more maps initiated when certain actions are taken (e.g., selecting a link, clicking a button, or the like). In an illustrative embodiment, a given map is associated with a page via a URL, although any convenient mechanism may be used to associate a page and a map. When that URL results from selecting a link or button on the Web page, a Web server supporting the support chain automation system has extensions that recognize it as a map (rather than, for example, a reference to another Web page). The active content functionality enables the user to determine if a particular technical problem described by an external page applies to the user's actual system.

According to the invention, active content is developed for specific audiences. Preferably, only the specific audience may then access the content that is written for it. In one embodiment, audiences are defined in a hierarchy, e.g., internal support users, premium end users, and regular end users, with all members of a higher level in the hierarchy (e.g., premium end users) being automatically included in the lower levels (e.g., regular end users). If given content is only written for higher level audiences, a member of a lower level audience does not have access to such content and, in fact, may not even know that it exists. Thus, active content categories that are written for specific higher level audiences are preferably hidden from view from members of lower level audiences.

Thus, according to the invention, given users of the guided self-help system are assigned to audiences within an audience hierarchy. A given audience has associated therewith given authoring or viewing rights. Active content is customized to the given audiences within the hierarchy. The active content is then served to given users during self-help sessions, e.g., in response to search requests, as a function of the audience assignment.

Thus, an audience at the highest level of the hierarchy (e.g., internal support engineers) typically has access to all active content. An audience at the lowest level of the hierarchy (e.g., regular end users) would have access to only some active content, and these users would not have authoring rights, namely, the right to create and post new active content. Certain other users, e.g., members of an intermediate level of the hierarchy, such as premium users, would have rights to see most active content and, perhaps, some authoring rights. Of course, the number of levels of the hierarchy and the privileges associated therewith may be varied to provide a robust guided self-service system.

At customizable points during a given self-help navigation, a user is given the option to escalate to live-help (e.g. an SE located at the technical support server). The question of when the user is given the option to escalate to live-help may depend on what audience to which he or she is assigned. Thus, for example, a user in a higher level audience (e.g., a premium end user who pays a fee for the service) may be afforded the opportunity to escalate to live help before a user in a relatively lower level audience. When the user selects an escalate to live help option, information about the user's self service efforts is provided to the technical support server automatically so that the user does not need to repeat or otherwise describe to the SE those actions that have already been considered or tried.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description.

BRIEF DESCRIPTION OF THE DRAWINGS

For a more complete understanding of the present invention and the advantages thereof, reference should be made to the following Detailed Description taken in connection with the accompanying drawings in which:

FIG. 7 is a representative screen display of a self-help home page that is rendered to the user with a system-supplied self-help search string;

FIG. 8 is a representative screen display of a search results template that is generated in response to a user's activation of a search;

FIG. 9 is a representative screen display of an activated page returned in response to a user's selection of a link in the search results template;

FIG. 10 is a representative screen display of an active self-help results page returned in response to the user selecting a Diagnose option in the activated page of FIG. 9;

FIG. 11 is a representative screen display of an active self-help results page returned in response to the user selecting a Fix option in the activated page of FIG. 9.

DETAILED DESCRIPTION OF THE PREFERRED EMBODIMENT

Figure 1:
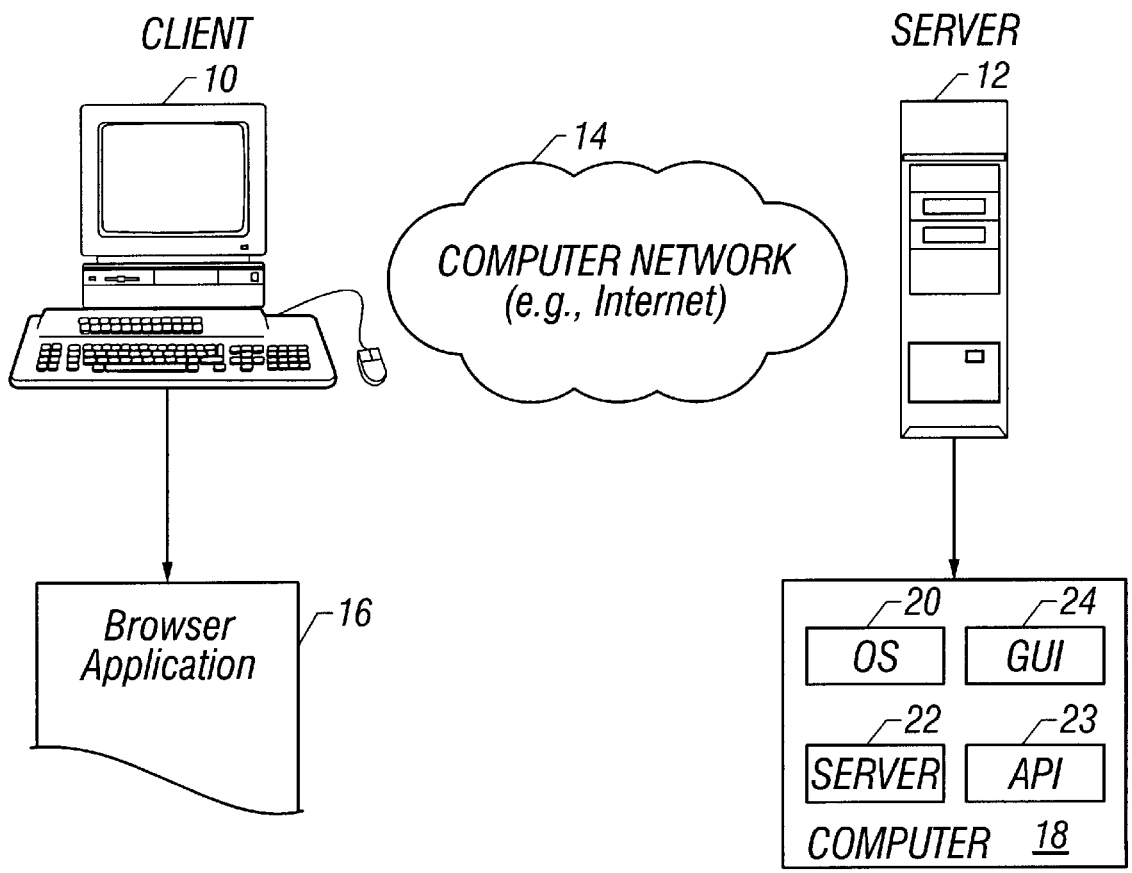
FIG. 1 is a block diagram of a representative Web client and server network environment in which the present invention may be implemented.

The present invention is implemented conveniently in an Internet or Web-based computer network, although this is not a requirement. Thus, by way of background, a representative Web client/Web server is illustrated in FIG. 1. In particular, a client machine 10 is connected to a Web server platform 12 via a communication channel 14.

As will be described, the invention assumes that a user of the client machine 10 has experienced a problem that desires automated technical support. According to the functionality described in Ser. No. 09/216,212, filed Dec. 18, 1999, which application is incorporated herein by reference, the user may attempt to solve the problem through a guided "self-help" process as will be described, or he or she may seek "live-help" from a technical support engineer (SE) located at the server platform (or at some other server), or the user may first attempt self-help and then escalate to live-help as needed.

For illustrative purposes, channel 14 is the public Internet, an intranet, an extranet or any other known network connection. Web server platform 12 is one of a plurality of servers which are accessible by clients, one of which is illustrated by machine 10. A representative client machine may include a Web browser 16, which is a known software tool used to access the servers of the network. The Web server platform supports files in the form of hypertext documents, graphics and other data type objects. The network path to a server (or to a file on the server) is identified by a Uniform Resource Locator (URL), and is well-known.

A representative Web Server platform 12 comprises a Compaq® computer 18 running the Windows NT Operating System 20 and a Web server program 22, such as Netscape Enterprise Server Version 3.51, that supports interface extensions. The platform 12 also includes a display supporting a graphical user interface (GUI) 24 for management and administration, and an Application Programming Interface (API) 23 to enable application developers to extend and/or customize the core functionality thereof through software programs such as servlets, CGI scripts, helper programs and plug-ins.

A representative Web client is a personal computer that is x86-, PowerPC®- or RISC-based, that includes an operating system such as Microsoft Windows '95 or NT, as well as a browser, such as Netscape Communicator (any version) or Internet Explorer (any version), having native support for application plug-ins. The Web client machine is connectable to the Web server(s) via the Internet, an intranet or some other computer network. The Web client browser typically includes a Java Virtual Machine (JVM), which provides a convenient runtime environment for programs written as Java applications or applets.

Although not required, the self-help functionality of related application Ser. No. 09/216,212 is preferably implemented as a Java application or applet (i.e. a set of Java program instructions or code) that is dynamically downloaded to the user's machine for execution. Of course, the self-help application (whether implemented in Java or otherwise) may simply reside on the user's machine. Some of the functionality described herein may be implemented on a server (e.g., as a servlet) and then delivered to the client as needed.

Although the Web client is typically a personal computer, this is not a requirement. The Web client may be any generalized information appliance having a processor, an operating system, optionally a browser application, and a means to connect the device to a computer network from which data may be retrieved. Such appliances include, without limitation, a handheld or palmtop device (e.g., running Windows CE 2.0 or higher), a diskless or so-called "network computer", a set-top computer terminal, or the like.

Figure 2:
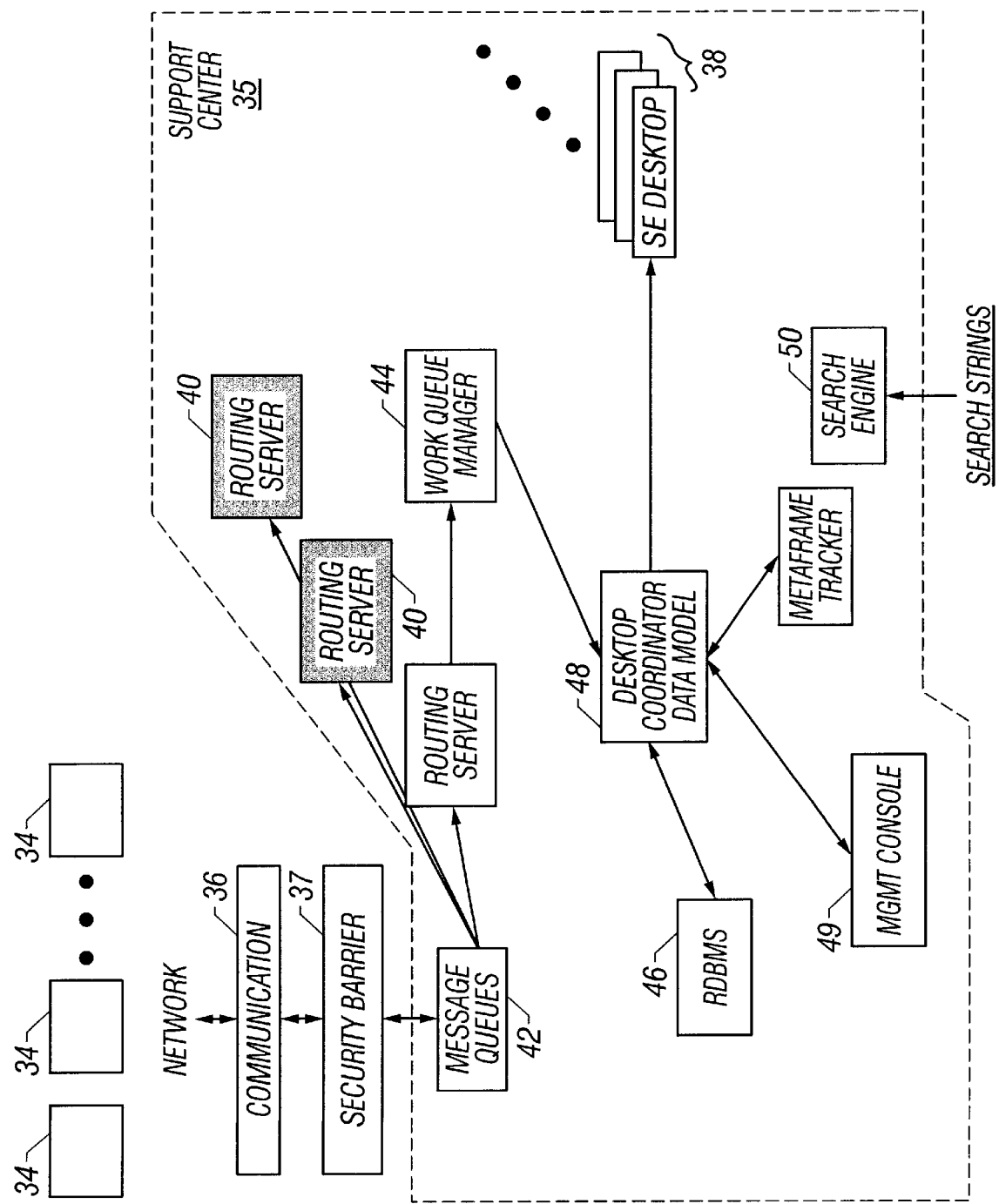
FIG. 2 is a block diagram illustrating the architecture of an technical support chain automation system in which a self-help functionality is implemented.

Although numerous system architectures may be used to implement the following techniques, one such architecture is illustrated in FIG. 2. This architecture is implemented, for example, in a corporate enterprise environment (such as an intranet), wherein a plurality of client machines (desktops) 34 interface with a support center 35 located at a server node through a network 36. The clients are the desktop machines used by the community of application end users. These are the users who use applications, encounter problems, and seek help. Typically, client machines 34 are separated from the network 36 via a firewall 37. Each client machine may include conventional browser software as discussed above. The server node may have associated therewith a set of one or more support engineer (SE) desktops 38 at which technical support personnel reside.

Under certain circumstances as will be described, a user of a given client machine may undertake to solve a particular problem normally requiring technical support through a self-help (or self-service) process. If necessary, the user also may be placed in contact (e.g., via a voice connection over the telephone, through an on-line Web connection, or the like) with a given technical support engineer. Typically, however, such technical support and service is provided in an automated manner, without necessarily connecting the user/customer to a support engineer via an audio or on-line link. In this environment, given interactions between a user (and, in particular, the user's computer) and an SE may occur without the user's actual knowledge or without any direct communication.

The diagnostic center 35 preferably comprises a number of functional components that are now described. The center includes one or more routing servers 40, and each routing server's primary responsibility is to route a given data set to a best-equipped support engineer to handle the call if live-help is required. To this end, information in the data set preferably is matched up against help desk "rules" to determine which group or person should handle the problem. Preferably, the routing server 40 attempts to assign data sets to a most appropriate message queue 42 (and thus, indirectly, to a most appropriate support engineer). Given support engineers preferably belong to a set of "groups", with each having an associated message queue 42 of assigned data sets. A given support engineer obtains ownership of a given data set from his or her respective queue until the session is complete or the call is reassigned to some other group. A work queue manager 44 is responsible for managing the message queues 42.

In addition to performing routing, communications, and data packaging services, the diagnostic center also supports the server portion of the automated support application. The server portion comprises a database server (e.g., a commercially available relational database management system (RDBMS)) 46 and an application server 48. A representative RDBMS is available from Oracle, Microsoft or others. The application server 48 provides a set of services to keep the support engineer desktops up-to-date as well as to provide general services to the application back-end. A given server also has (or has access to) a search engine 50 to facilitate searching for known technical support solutions.

Thus, the diagnostic center routes incoming calls (that require live help) to the best call group queue, provides services to the SE desktops, provides services to the support center management console 49, and interfaces to third party products/systems that store configuration data and track results. The management console is a mission control for support center activities. Preferably, the console 49 has both data display and system configuration capabilities. The data displays are both real-time and historic views into the call center metrics, and the configuration dialogs are used to set operational characteristics of the server. A convenient browser-based or other user interface may be used for this purpose.

Figure 3:
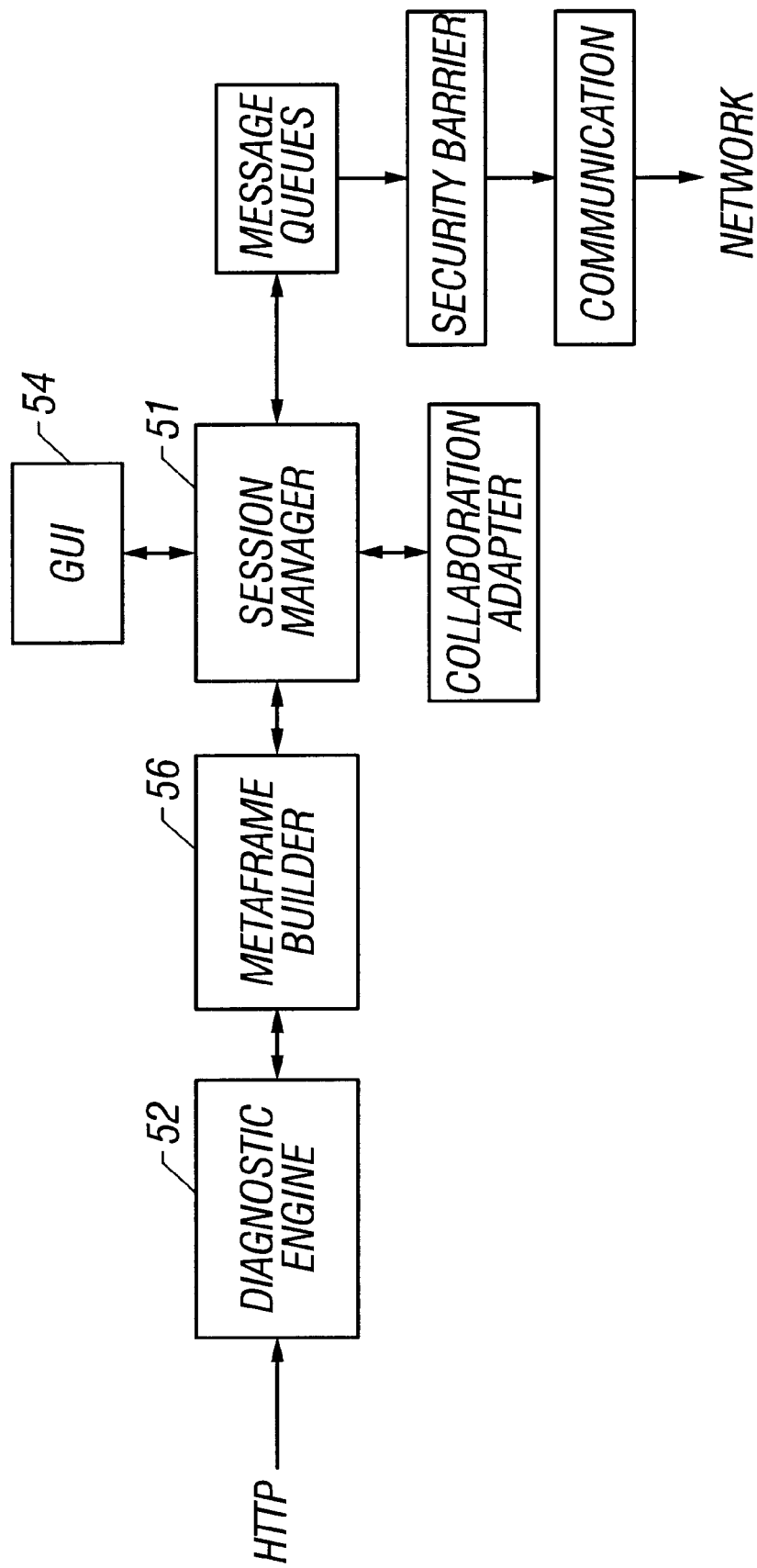
FIG. 3 is a block diagram of the components of the technical support chain automation system implemented on a client machine.

A block diagram of the "client" piece of the automated technical support chain automation system is illustrated in FIG. 3. The client piece executes on the client machine 10 (on which the technical problem has arisen) to perform an initial diagnosis in response to a given occurrence (e.g., a PANIC), to facilitate user self-help (as will be described), to submit the diagnosis to the diagnostic center, and to collaborate with the server components in the center to perform further tests, preferably in an iterative manner, and, if possible, to make repairs. One such iterative distributed problem solving technique is described in Ser. No. 09/073,464, titled "Method, System and Computer Program Product For Iterative Distributed Problem Solving," assigned to the assignee of this invention. That application is incorporated herein by reference.

The major client components includes a session manager 51, a diagnostic engine 52 and a graphical user interface (GUI) 54. The session manager 51 takes the initial diagnosis (using a diagnostic map), submits it to the server, tracks open problems, and coordinates the flow of information between the client and the support center. The diagnostic engine is a core piece of code that diagnoses problems and collects data as defined by the diagnostic map(s). It cooperates with a data set builder 56 to create data sets, and it works together with the session manager 51 to forward such data sets to the diagnostic center. The client side GUI 54 may be a simple display icon on the user's desktop that is activated when required by the user seeking technical support. The client GUI 54 may also be used to provide dialog boxes or the like to enable the user to monitor and/or interact during a connection with an SE when live help is required.

In the system illustrated in FIGS. 2–3, all communications are made conveniently over TCP networks, but such communications are not dependent on persistent TCP connections. Instead, a single logical session may span multiple TCP connections. A communications subsystem preferably interfaces the client and diagnostic center, managing the input and output queues, and providing basic network location services. In addition, the system may include a security subsystem as network communications should be secure. Thus, for example, a given data set is preferably sealed to restrict access to the data to those having proper credentials. All operations performed on the client machine preferably must first pass security conditions to ensure that only support engineers authorized by the client may inspect of change the client.

Figure 4:
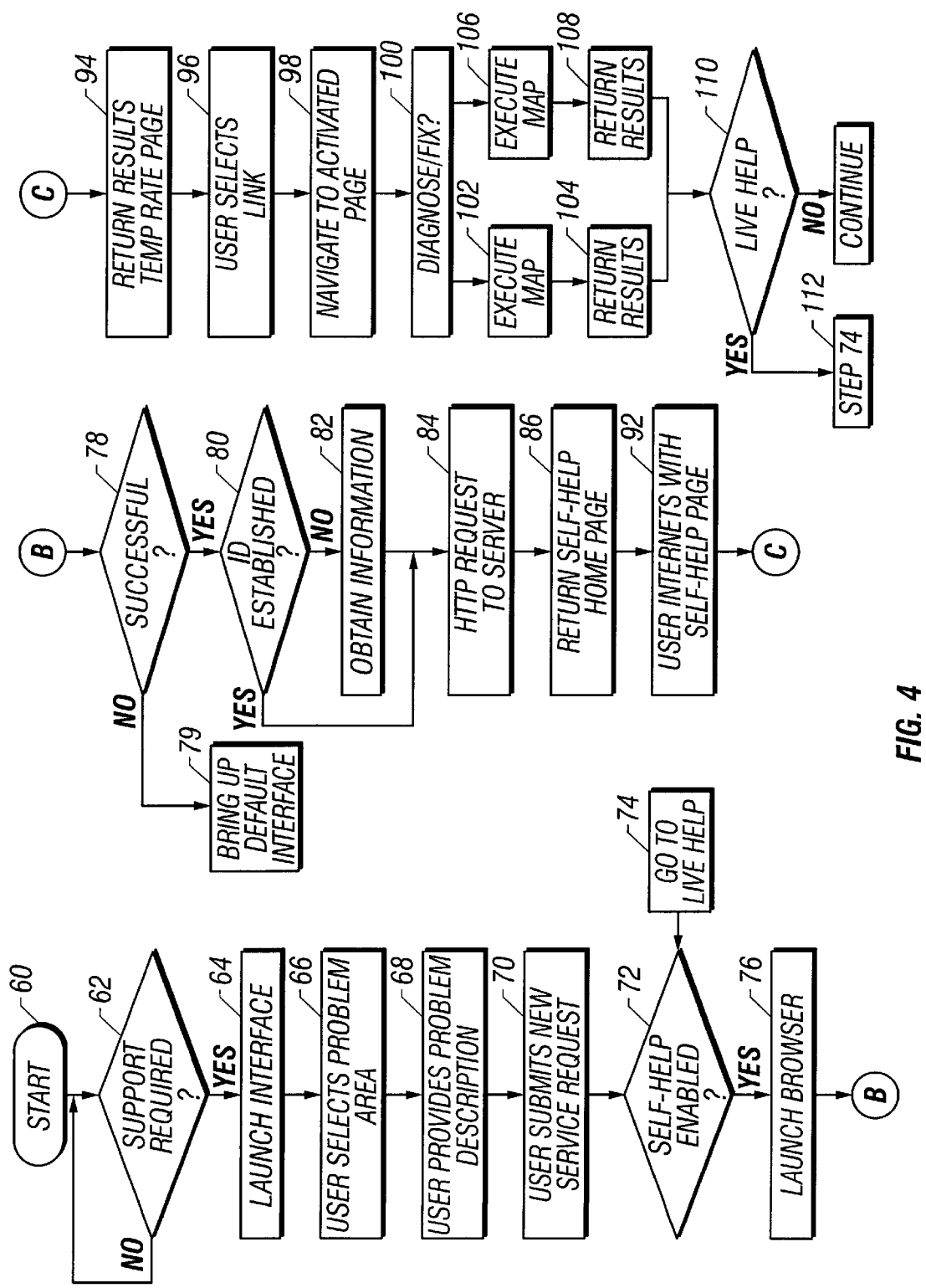
FIG. 4 is a flowchart illustrating a preferred self-help method of automated technical support.

A simplified flowchart showing the self-help technique is illustrated in FIG. 4. In the illustrative example to follow, it is assumed that the user has tried, unsuccessfully, to launch a Microsoft Word application and, instead, he or she has received an error message (e.g., "wwintl32.dll error"). The display of this error message has prompted the user to request technical support.

Several of the steps described and illustrated are provided by way of background or context and should not be taken as limiting. The routine begins at step 60. At step 62, a test is run to determine whether the user requires automated technical support. If not, the routine cycles. If, however, the user has indicated his or her request for technical support (e.g., by double clicking an icon in a UI support tray), the routine continues at step 64 to launch the client program code and its associated server interface (sometimes referred to herein as the Motive Assistant™).

Figure 5:
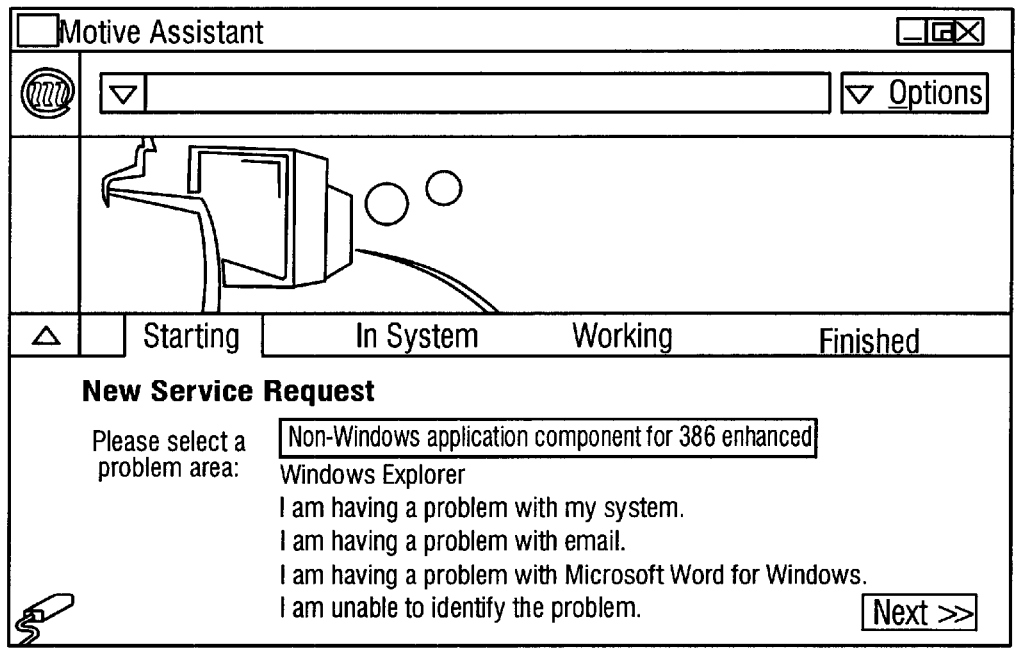
FIG. 5 is a representative screen display of a self-help interface that is launched to initiate an automated technical session n.
Figure 6:
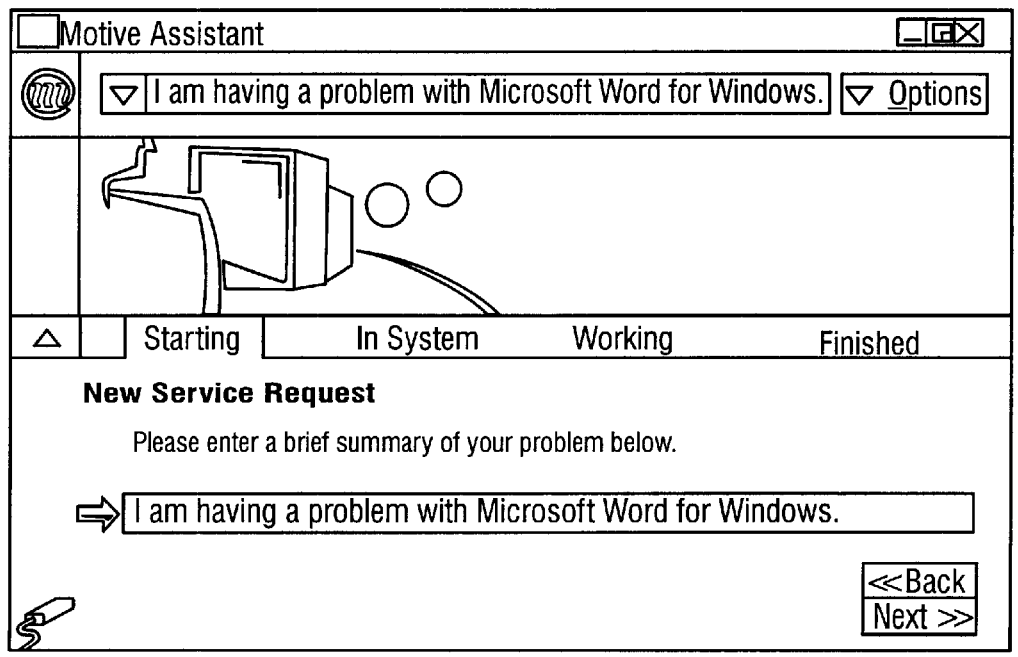
FIG. 6 is a representative screen display panel of the self-help interface.

This operation brings up a technical support interface such as illustrated in FIG. 5. As can be seen, the interface preferably includes a listbox that includes a list of possible "problem areas" that may be selected by the user for a New Service Request. At step 66, the user selects a problem area. At this point, the user may be prompted to provide a brief summary of the problem encountered. This is step 68. An illustrative dialog screen for this step is shown in FIG. 6. Thus, in steps 66 and 68, a problem area and description are entered by the user. These steps may be combined. In the illustrative example, the user is having difficulty starting a Microsoft Word application. At step 70, the user submits the New Service Request with the appropriate information.

A test is then performed at step 72 to determine if the self-help function is enabled. If not, the routine branches to step 74 to provide the current problem to the live-help system (namely, an SE). If, however, the self-help function is enabled, the routine continues at step 76. At this time, the user's default Web browser if launched. A Web browser navigation metaphor preferably is used to provide the user with a comfortable and intuitive interaction with the self-help system, although the self-help UI may be system-configurable. At step 78, a test is performed to determine whether the user's browser has launched. If the outcome of the test at step 78 is negative, the routine skips the self-help process and (at step 78) makes the default interface visible for connecting to live-help.

If, however, the outcome of the test at step 78 is positive, the routine continues at step 80 to test whether the user's identity has been established by the automated technical support system. If not, the routine continues at step 82 to obtain the user's contact information to store such information in a registry. Thereafter, or if the outcome of the test at step is positive, the routine continues at step 84.

In particular, an HTTP request is then made to the automated technical support server. Based on the contact information (as well as other basic parameters such as OS type, values entered by the user in problem submission fields, and the like) passed, the routine then continues at step 86 to serve a self-help home page to the user's default browser. A representative self-help home page, based on the Microsoft Word example previously described, is illustrated in FIG. 7. The home page preferably includes a search field 88 that is populated automatically, namely, by the system itself, by a self-help search string 90. The home page is displayed as a starting point to enable the user to attempt to solve the problem at hand. As can be seen, the home page may include Alerts and Late Breaking Information, a link to a Current Category that the problem is associated with, and a set of SubCategories, each with appropriate links. The home page may also include links 91 to so-called "active content" for the Current Category comprising FAQs, Release Notes, Support Notes, and the like. These links help the user search the existing knowledge base.

Thus, as described in related application Ser. No. 09/216, 212, guided self-help is facilitated through use of so-called "active content" pages. Active content is Web-based content (i.e., content viewable by a Web browser) that has one or more diagnostic maps initiated when certain actions are taken (e.g., selecting a link, clicking a button, or the like). In an illustrative embodiment, a given diagnostic map is associated with a page via a URL, although any convenient mechanism may be used to associate a page and a map. When that URL results from selecting a link or button on the Web page, a Web server supporting the support chain automation system has special extensions that recognize it as a map (rather than, for example, a reference to another Web page). The active content functionality enables the user to determine if a particular technical problem described by an external page applies to the user's actual system.

Generalizing, regular HTML-based content is sometimes referred to herein as basic content. It may include FAQs, problem/resolution notes, alerts, how to notes, update notes, as well as other types of support information. "Active content" refers generally to basic content that has been activated with an "activator". An activator is an object that adds intelligence to the basic content. An illustrative activator is a diagnostic map. Active content may also be thought of as basic content that has been activated by attaching one or more diagnostic maps to such content.

Thus, there may be several different types (e.g., FAQ, Alert, Note, etc.) of active content. Existing Web site information and Web site look and feel may be incorporated into the technical support server by editing a set of default active content related templates, one for each type. Active content may link to other Web-based content via URLs to provide full function multimedia support notes, "how to" information, and the like.

Referring now back to FIG. 7, the page is based on the Web browser metaphor and is template-based for ease of configuration. In particular, the diagnostic center may modify the look and feel of the self-help system to match a given theme, layout or motif.

The search string 90 is a value that, when fed into the technical support server's search engine 50, should produce relevant hits, namely, information for solving the technical problem. Preferably, information served in response to execution of the search string depends on a given audience to which the user belongs. In the preferred embodiment, the search string is generated dynamically through the use of a diagnostic map that executes on the client machine. The diagnostic map examines the client system (including the existing applications, registry information and the like) and communicates with the technical support server to derive the search string as a background task, namely, without user input. A given diagnostic map is a programmable, reusable object that allows a technical support engineer (SE) or the others to write custom tools for diagnosing problems.

Although not illustrated in FIG. 7, it should be appreciated that, in some instances, execution of a diagnostic map run during the self-help process produces a self-help answer ("you have problem x") or a self-help URL (or series of URLs) that the user should probably investigate. It should also be noted that the notion of a diagnostic map preferably is not surfaced directly to the user. During the execution of a given map, however, the user may be asked if he or she desires to check for a particular problem, apply a patch, or the like).

Returning to FIG. 4, at step 92, the user interacts with the self-help page by navigating the default browser. In this illustrative example, the user launches the search that has been proposed by the system. Alternatively, the system may launch the search automatically for the user. At step 94, the routine returns a results template page that, in this example, identifies a Support Note link. A representative results template page is shown in FIG. 8. In this example, the page identifies a Support Note that describes the user's problem (namely, the inability to start Microsoft Word). and the associated error message that prompted the user to initiate the session in the first instance. As noted above, preferably the search results returned only include content written for the end user's audience.

Based on the clear relevance of the Support Note, the user selects the link. This is step 96. Upon activation of the link, the routine continues at step 98 to navigate the browser to a so-called "activated page" as illustrated in FIG. 9. A page is said to be activated because it may include active content. As illustrated, the activated page provides the user an option to further diagnose the problem, by selecting a Diagnose button, and/or the option to apply a fix to the problem, by selecting a Fix button. Each of these options has associated therewith additional explanatory text to facilitate the user's selection. At step 100, a test is performed to determine whether the user has selected the to Diagnose or to Fix.

The routine branches to step 102 if the user selects Diagnose to execute another diagnostic map. At step 104, the routine then returns and populates a self-help results page such as illustrated in FIG. 10. This page includes appropriate text identifying whether or not the user's system does, in fact, have the problem identified. It may also include related links and information as illustrated. The user may then navigate to the related links and other information.

Alternatively, the routine branches to step 106 if the user selects Fix and executes the required fix. At step 108, the routine returns a self-help results page populated with information confirming the action. Given the previous Microsoft Word example, the self-help results page returned is illustrated in FIG. 11. This page, likewise, may include related links and information.

The self-help results page (in either case) may include a link to live-help. Thus, at step 110, the routine tests to determine whether live-help is requested. If so, the routine branches to step 112 and establishes a live SE connection; otherwise, the routine continues processing the self-help function. This completes the processing.

The technical support system may interact with the user's local machine to execute diagnostic maps using a "mini Web server" process running on the client. Thus, for example, the execute map step 102, among others, may be implemented in this manner. One preferred method for executing a map locally from the client browser begins by sending a special URL to the local mini Web server. The local process authenticates the user, breaks apart the URL to determine which map to run, checks to see if the map is present (and, if not, downloads the map from the system server), "executes" the instructions of the map, collects the resulting XML, and then parses the XML looking for self-service tags to be used for further navigation purposes. Thus, for example, the tags enable the user to navigate to a page that describes the problem or to how to fix the problem. This process is also used to generate the system-supplied search string.

According to a feature of the present invention, active content is developed for specific "audiences". Preferably, only the specific audience for which given content is written has access to that content. This audience functionality is used to control who can view and search pieces of active content.

Figure 12:
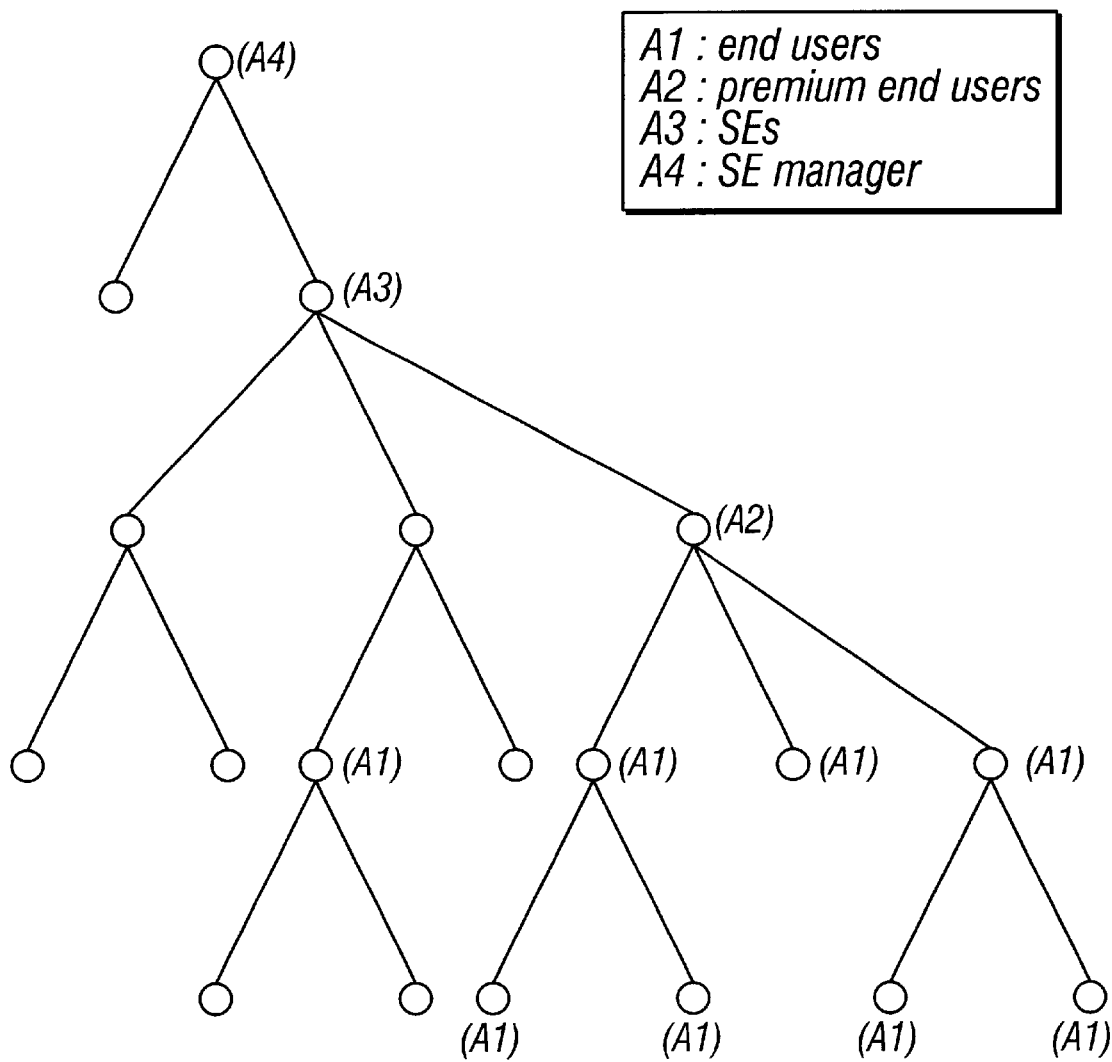
FIG. 12 is a simplified representation of an active content database and illustrative audience associations according to a feature of the present invention.

Preferably, the active content database is organized as a directory tree, as represented in the illustration shown in FIG. 12. Each active content component, i.e., each node of the directory, preferably has associated therewith a set of one or more audiences. Any particular node of the content database may be assigned to an audience. Each content piece preferably has a target audience for which it was written. If a user is not a member of the audience for which the content was written, he or she cannot see it. In this example, there is an audience A1, which represents an audience of end users, an audience A2, which represents an audience of premium end users, an audience A3, which represents an audience of internal support personnel, an audience A4, which represent an audience of internal management personnel, and so on. As can be seen, each content piece has associated therewith an indication of the intended audience (s) for that piece.

Preferably, the audiences are hierarchical so that a member of an audience can have access to other audiences, but not necessarily vice versa. Any number of audiences may be provided for within the hierarchy. For example, there may be just three (3) audiences: internal support, premium end user and end user. In this illustrative example, all support engineers would be defined to be members of the internal support audience. As the highest level audience, all engineers would have access to the other two default audiences. Members of the premium audience (the intermediate class) would have the right to view the non-premium end user audience content but not the content of the higher level, namely, the internal support audience content. The end user audience, at the lowest level of the hierarchy, would not have any right to view any other audience's content except the content written specifically for that audience. In this way, given active content is authored for given audiences, who view a subset of the active content database through a template designed for that audience. This functionality provides a more robust and effective guided self-help session.

In certain circumstances, the audience mechanism may be configured so that even a member of a higher level audience is selectively excluded from viewing content written for a lower level audience. As an example, content is created for an audience named "Windows 95 Related," and other content is created for an audience named "Windows NT Related." An internal support user (a higher level user) might be interested in both, one or none of the content components. Thus, this alternative control methodology allows the system operator to exclude the higher level user as appropriate.

A given audience acts as a filter. Thus, if a given person were a member of a specific audience and does not have the right to read content written for some other audience, from the given person's point of view, that other content does not exist. According to the invention, given active content is categorized and written to conform to an audience hierarchy, thus providing an audience-personalized view of the content (e.g., a different home page for each audience).

Thus, according to the present invention, a hierarchy of active content audiences is defined. This hierarchy may contain any desired number of levels or sublevels. Active content is authored or segmented into different viewable groups. As a result, given content or content categories are then made available or hidden, depending on a user's particular status within the hierarchy. The way in which a given user may view active content thus is dependent on what audience he or she belongs. A given audience may then be afforded additional service or privileges (e.g., faster access to live help) as compared to users in other audiences.

Although not meant to be limiting, one preferred method for implementing audiences is to associate a user with a given audience upon configuring the user's system to run the self-help functionality. At the server, each audience may then be associated with a given routing queue. Thus, there may be a first routing queue for a first audience, a second routing queue for a second audience, and so forth. Instead of routing queues, the user may simply identify the audience to which he or she belongs, together with a password. Information identifying a user's audience assignment may then be encoded within communications between client or server, or the audience assignment may simply be determined by examining the communication. According to a preferred embodiment, if a given user cannot be mapped into an audience, he or she is assigned to the lowest level audience in the hierarchy for convenience.

The particular type of active content associated with a given audience will vary widely depending on the application and the identity of the users. Thus, for example, it may be desired that, because of the nature of the content, only a given audience should have the right to create and/or view it. This would be the case in the situation where the active content includes complex technical materials that might only prove useful to the most sophisticated users (e.g., internal support engineers). Alternatively, it may be desired to limit rights to the content to a given audience whose members have paid for the right to view such content. Thus, such content might only be served to premium end users, but not regular end users, irrespective of the complexity of the materials included in the active content. In any case, the use of audiences allows the service provider to restrict the manner in which the active content is authored, viewed and/or served.

Although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, "Web client" should be broadly construed to mean any computer or component thereof directly or indirectly connected or connectable in any known or later-developed manner to a computer network, such as the Internet. The term "Web server" should also be broadly construed to mean a computer, computer platform, an adjunct to a computer or platform, or any component thereof. Of course, a "client" should be broadly construed to mean one who requests or gets the file, and "server" is the entity which downloads the file. Moreover, although the present invention is described in the context of the Hypertext Markup Language (HTML), those of ordinary skill in the art will appreciate that the invention is applicable to alternative markup languages including, without limitation, SGML (Standard Generalized Markup Language) and XML (Extended Markup Language).

Having thus described our invention, what we claim as new and desire to secure by letters patent is set forth in the following claims:

What is claimed is:

1. A method for automated technical support in a computer enterprise having a set of client machines connectable to a set of one or more server machines, comprising the steps of:
   assigning users of the client and server machines to a hierarchy of audiences, wherein a given audience within the hierarchy has a right to view active content written for that audience and active content written for any audience within the hierarchy at a lower level in the hierarchy; and
   during guided technical support sessions, selectively serving active content to users of the client machines and the server machines as a function of the audience assignments;
   wherein the active content further comprises basic content and a diagnostic map, wherein the basic content is content selected from a plurality of content types, wherein the diagnostic map is configured to, upon execution, examine the client machine and capture diagnostic data.

2. The method as described in claim 1 wherein the active content is served in response to a search request.

3. The method as described in claim 2 wherein the active content is basic content that has been activated with an activator, the basic content selected from a content group consisting essentially of FAQ2, release notes, support notes and at least one URL to a Web technical support resource.

4. The method as described in claim 3 wherein the activator is a diagnostic map.

5. The method as described in claim 1 further including the step of segmenting an active content database into different viewable groups.

6. The method as described in claim 5 wherein support engineers located at the server machines are members of a highest level audience.

7. The method as described in claim 1 wherein the audience hierarchy includes a highest level, one or more intermediate levels, and a lowest level.

8. The method as described in claim 7 wherein given end users located at the client machines are members of an intermediate level audience.

9. The method as described in claim 8 wherein a remainder of the end users located at the client machines are members of a lowest level audience.

10. The method as described in claim 1 wherein the client machines are connectable to the one or more server machines via the Internet.

11. A method for automated technical support in a computer enterprise having a set of client machines connectable to a set of one or more server machines, comprising the steps of:
   segmenting an active content database;
   assigning users to a hierarchy of audiences, wherein a given audience within the hierarchy has a right to view active content written for that audience and active content written for any audience within the hierarchy at a lower level in the hierarchy;
   associating given segments of the active content database with given audiences in the hierarchy; and
   during a guided technical support session initiated by a user, selectively serving active content to the user as a function of the audience to which the user has been assigned;
   wherein the active content further comprises basic content and a diagnostic map, wherein the basic content is content selected from a plurality of content types, wherein the diagnostic map is configured to, upon execution, examine the client machine and capture diagnostic data.

12. The method as described in claim 11 wherein the active content is basic content that has been activated with an activator.

13. The method as described in claim 12 wherein the basic content is content selected from a content group consisting essentially of FAQs, release notes, support notes and at least one URL to a Web technical support resource.

14. The method as described in claim 12 wherein the activator is a map.

15. A method for automated technical support in a computer enterprise having a set of client machines connectable to a set of one or more server machines, comprising the steps of:

assigning a user of a client machine to a hierarchy of audiences, wherein a given audience within the hierarchy has a right to view active content written for that audience;

in response to entry by the user of a problem, automatically generating a search string that, upon execution in a search engine, is expected to return relevant search results; and upon execution of the search string, returning relevant search results as a function of the user's audience assignment;

wherein the active content further comprises basic content and a diagnostic map, wherein the basic content is content selected from a plurality of content types, wherein the diagnostic map is configured to, upon execution, examine the client machine and capture diagnostic data.

16. A method for automated technical support in a computer enterprise having a set of client machines connectable to a set of one or more server machines, comprising the steps of:

assigning users of the client and server machines to a hierarchy of audiences, wherein:

a given audience within the hierarchy has a right to view active content written for that audience and active content written for any audience within the hierarchy at a lower level in the hierarchy, and the audience hierarchy includes:
a highest level including users of the server machines,
one or more intermediate levels including users of the client machines, and
a lowest level, including a remainder of users of the client machines; and during guided technical support sessions, selectively serving active content to users of the client machines and the server machines as a function of the audience assignments;

wherein the active content further comprises basic content and a diagnostic map, wherein the basic content is content selected from a plurality of content types, wherein the diagnostic map is configured to, upon execution, examine the client machine and capture diagnostic data.

* * * * *